(12) United States Patent
Gabbai

(10) Patent No.: US 12,314,895 B2
(45) Date of Patent: *May 27, 2025

(54) CONTAINER TOUCH-PAIRING DEVICE

(71) Applicant: eBay Inc., San Jose, CA (US)

(72) Inventor: Jonathan Gabbai, London (GB)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/387,989

(22) Filed: Nov. 8, 2023

(65) Prior Publication Data

US 2024/0070606 A1 Feb. 29, 2024

Related U.S. Application Data

(63) Continuation of application No. 16/445,342, filed on Jun. 19, 2019, now Pat. No. 11,847,609, which is a continuation of application No. 14/982,582, filed on Dec. 29, 2015, now Pat. No. 10,360,530.

(51) Int. Cl.
  *G06Q 10/083* (2024.01)
  *H04B 1/38* (2015.01)

(52) U.S. Cl.
  CPC .......... *G06Q 10/0838* (2013.01); *H04B 1/38* (2013.01)

(58) Field of Classification Search
  None
  See application file for complete search history.

(56) References Cited

U.S. PATENT DOCUMENTS

| 5,497,140 | A | 3/1996 | Tuttle |
| 9,142,035 | B1 | 9/2015 | Rotman et al. |
| 10,011,387 | B1 * | 7/2018 | Payauys ............. B65B 57/02 |
| 10,071,804 | B1 * | 9/2018 | Buchmueller ....... B64U 50/19 |

(Continued)

FOREIGN PATENT DOCUMENTS

CA  2876040  12/2012

OTHER PUBLICATIONS

Dario Pacciarelli, Applying RFID in warehouse operations of an Italian courier express company, Jul. 21, 2011, Springer (Year: 2011).*

(Continued)

*Primary Examiner* — Ismail A Manejwala
(74) *Attorney, Agent, or Firm* — SCHWEGMAN LUNDBERG & WOESSNER, P.A.

(57) ABSTRACT

Systems and methods change a user interface for the purpose of pairing a shipping container with an item that is intended to be shipped in the shipping container. Example embodiments include a machine-implemented method for accessing a shipping request, detecting a radio signal from a candidate container using a radio receiver, detecting an impact between a pairing device and a query container using an accelerometer, determining that the query container is the candidate container, and generating a shipping record that correlates the shipping container and the item. The device can further determine that the query container is the candidate container based on the signal strength and change in signal strength of one or more signals. The device can further detect an impact between the pairing device and the query container by ranking one or more sets of acceleration data collected by the accelerometer.

20 Claims, 13 Drawing Sheets

(56) References Cited

U.S. PATENT DOCUMENTS

| | | | |
|---|---|---|---|
| 10,360,530 B2 | 7/2019 | Gabbai | |
| 11,847,609 B2 | 12/2023 | Gabbai | |
| 2007/0188323 A1 | 8/2007 | Sinclair et al. | |
| 2008/0195735 A1* | 8/2008 | Hodges | G05B 19/042 709/227 |
| 2013/0173487 A1* | 7/2013 | May | G06Q 10/00 705/333 |
| 2017/0185958 A1 | 6/2017 | Gabbai | |
| 2019/0333017 A1 | 10/2019 | Gabbai | |

OTHER PUBLICATIONS

"U.S. Appl. No. 14/982,582, Notice of Allowance mailed Mar. 13, 2019", 10 pgs.

"U.S. Appl. No. 16/445,342, Non Final Office Action mailed Feb. 22, 2022", 25 pgs.

"U.S. Appl. No. 16/445,342, Examiner Interview Summary mailed May 13, 2022", 3 pgs.

"U.S. Appl. No. 16/445,342, Final Office Action mailed Sep. 21, 2022", 14 pgs.

"U.S. Appl. No. 16/445,342, Non Final Office Action mailed Mar. 17, 2023", 13 pgs.

"U.S. Appl. No. 16/445,342, Examiner Interview Summary mailed May 19, 2023", 2 pgs.

"U.S. Appl. No. 16/445,342, Notice of Allowance mailed Aug. 15, 2023", 14 pgs.

Dario, Pacciarelli, "Applying RFID in Warehouse Operations of an Italian Courier Express Company", Springer, (Jul. 21, 2011), 15 pgs.

Mannini, "Activity Recognition using a single accelerometer placed at the wrist or the ankle", Med Sci Sports Exerc, (Nov. 1, 2014).

U.S. Appl. No. 14/982,582 U.S. Pat. No. 10,360,530, filed Dec. 29, 2015, Container Touch-Pairing Device.

U.S. Appl. No. 16/445,342 U.S. Pat. No. 11,847,609, filed Jun. 19, 2019, Container Touch-Pairing Device.

* cited by examiner

CONTAINER TOUCH-PAIRING DEVICE

CLAIM OF PRIORITY

This application is a continuation of U.S. application Ser. No. 16/445,342, filed Jun. 19, 2019, which is a continuation of U.S. application Ser. No. 14/982,582, filed Dec. 29, 2015, now issued as U.S. Pat. No. 10,360,530, on Jul. 23, 2019, each of which is hereby incorporated by reference in its entirety.

TECHNICAL FIELD

The subject matter disclosed herein generally relates to the technical field of special-purpose machines that facilitate shipment of items, including computerized variants of such special-purpose machines and improvements to such variants, and to the technologies by which such special-purpose machines become improved compared to other special-purpose machines that facilitate shipping items. Specifically, the present disclosure addresses systems and methods to facilitate associating a shippable item with a container.

BACKGROUND

A device may be configured to interact with one or more users by guiding a user in shipping an item. The device may make information available to a user, the information describing the type of shipping container necessary for shipping an item. The device may further provide an interface for the input information about a container that the user intends to use, such that the device can associate a shipping container with the item. The device can use this information track and report actions involving the container to the user and to other users. However, the association process typically involves the user verifying that the shipping container is appropriate and correctly inputting information about the container. These steps may discourage some users from interacting or inputting the information about the container. Additionally, users may input incorrect information about the shipping container.

BRIEF DESCRIPTION OF THE DRAWINGS

Some example embodiments are illustrated by way of example and not limitation in the figures of the accompanying drawings.

DETAILED DESCRIPTION

Example methods (e.g., algorithms) set forth various functions of a container touch-pairing device, and example systems (e.g., special-purpose machines) are configured to perform such functions. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The container touch-pairing device (pairing device) performs a method in which the pairing device accesses a shipping request to ship an item, detects a radio signal from a candidate container, detects an impact with a query container, determines that the query container is the candidate container, and generates a shipping record for the candidate container. The shipping request includes information about the item, and such information can include a shipping identifier and a set of threshold dimensions for a shipping container. According to some example embodiments, the method further includes receiving a radio signal that is generated by a signal chip that is located inside the candidate container and the radio signal containing a container identifier and a set of candidate dimensions. In certain example embodiments, the method further includes detecting an impact between the pairing device and a query container, the detection being based on acceleration data generated by the accelerometer. Various example embodiments of the method determining the query container is the candidate container based on the pairing device detecting the radio signal at the same time (e.g., within one second) as the pairing device detects the impact between the pairing device and the query container.

The method may further include determining that the query container is the candidate container based on the acceleration data, the strength of the radio signal, a change in the strength of the radio signal, or any suitable combination thereof. Some example embodiments of the method further include accessing the candidate dimensions contained in the radio signal and comparing the candidate dimensions with the threshold dimensions received in the shipping request. Certain example embodiments of the method further include the device generating a shipping record that correlates the shipping identifier and the container identifier.

Figure 1:
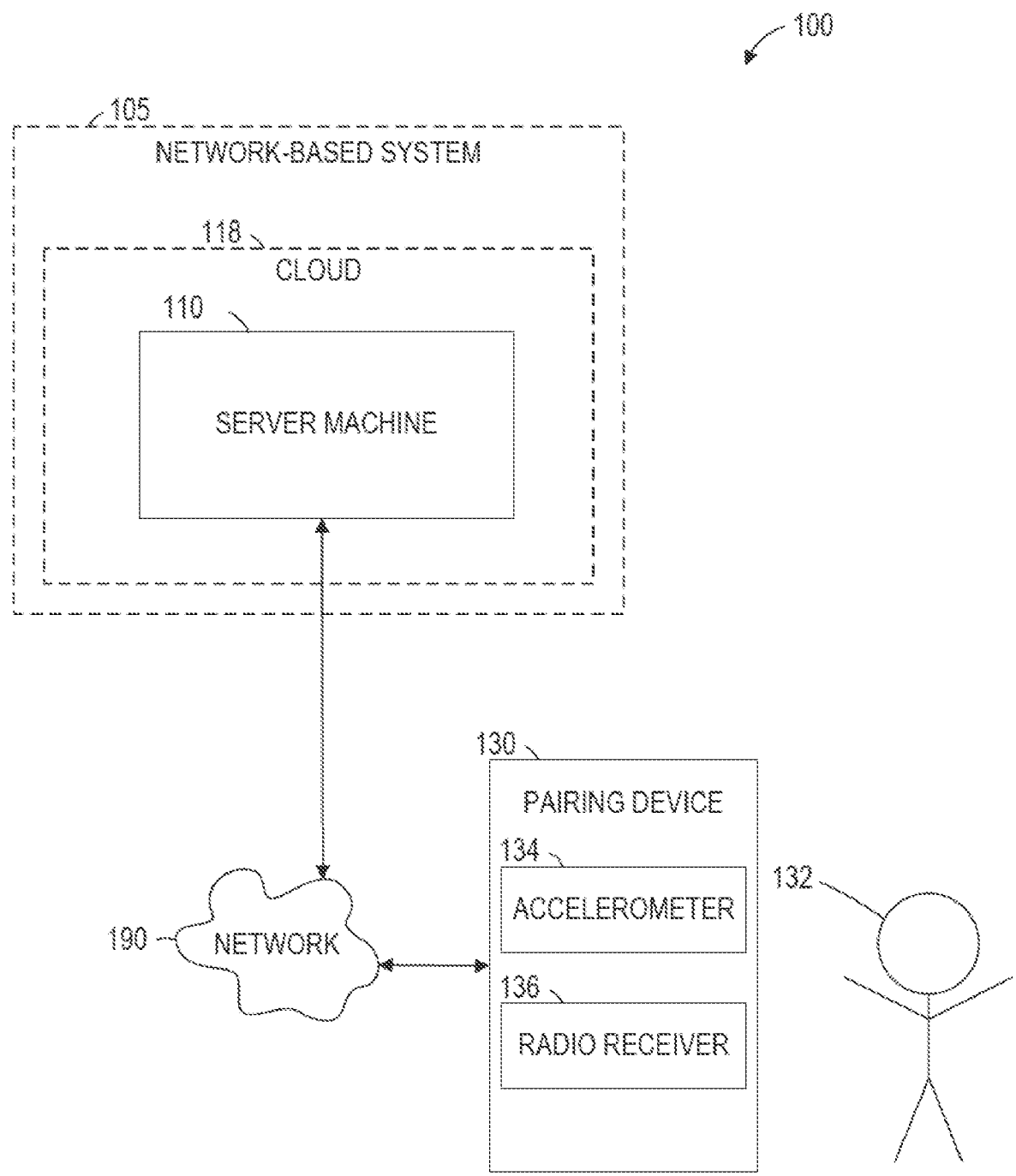
FIG. 1 is a network diagram illustrating a network environment suitable for a container touch-pairing device, according to some example embodiments.

FIG. 1 is a network diagram illustrating a network environment 100 suitable for a container touch-pairing device, according to some example embodiments. The network environment 100 includes a server machine 110 and a pairing device 130 (e.g., a container touch-pairing device) communicatively coupled via a network 190. The server machine 110 may form all or part of a cloud 118 (e.g., a geographically distributed set of multiple machines configured to function as a single server), which may form all or part of a network-based system 105 (e.g., a cloud-based server system configured to provide one or more network-based services to the pairing device 130). The server machine 110 and the pairing device 130 may each be implemented in a special-purpose (e.g., specialized) computer system, in whole or in part, as described below with respect to FIG. 13.

The pairing device 130 pairs a shipping container with an item that is to be transported in a shipping container. In some example embodiments, the pairing device 130 includes an accelerometer 134 to generate acceleration data. Acceleration data may be generated when a user 132 moves the pairing device 130, such as the user 132 moving the pairing device 130 to touch a shipping container in order to pair an item with the container. The pairing device 130 additionally includes a radio receiver 136 capable of detecting one or more radio signals.

User 132 may be a human user (e.g., a human being), a machine user (e.g., a computer configured by a software program to interact with the pairing device 130), or any suitable combination thereof (e.g., a human assisted by a machine or a machine supervised by a human). The user 132 is associated with the pairing device 130 and may be a user of the pairing device 130. For example, the pairing device 130 may a tablet computer, a navigational device, a portable media device, a smart phone, or a wearable device (e.g., a smart watch, smart glasses, smart clothing, or smart jewelry) belonging to the user 132.

Any of the systems or machines (e.g., devices) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 13, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Any two or more of the systems or machines illustrated in FIG. 1 may be combined into a single machine, and the functions described herein for any single system or machine may be subdivided among multiple systems or machines.

The network 190 may be any network that enables communication between or among systems, machines, databases, and devices (e.g., between the server machine 110 and the pairing device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
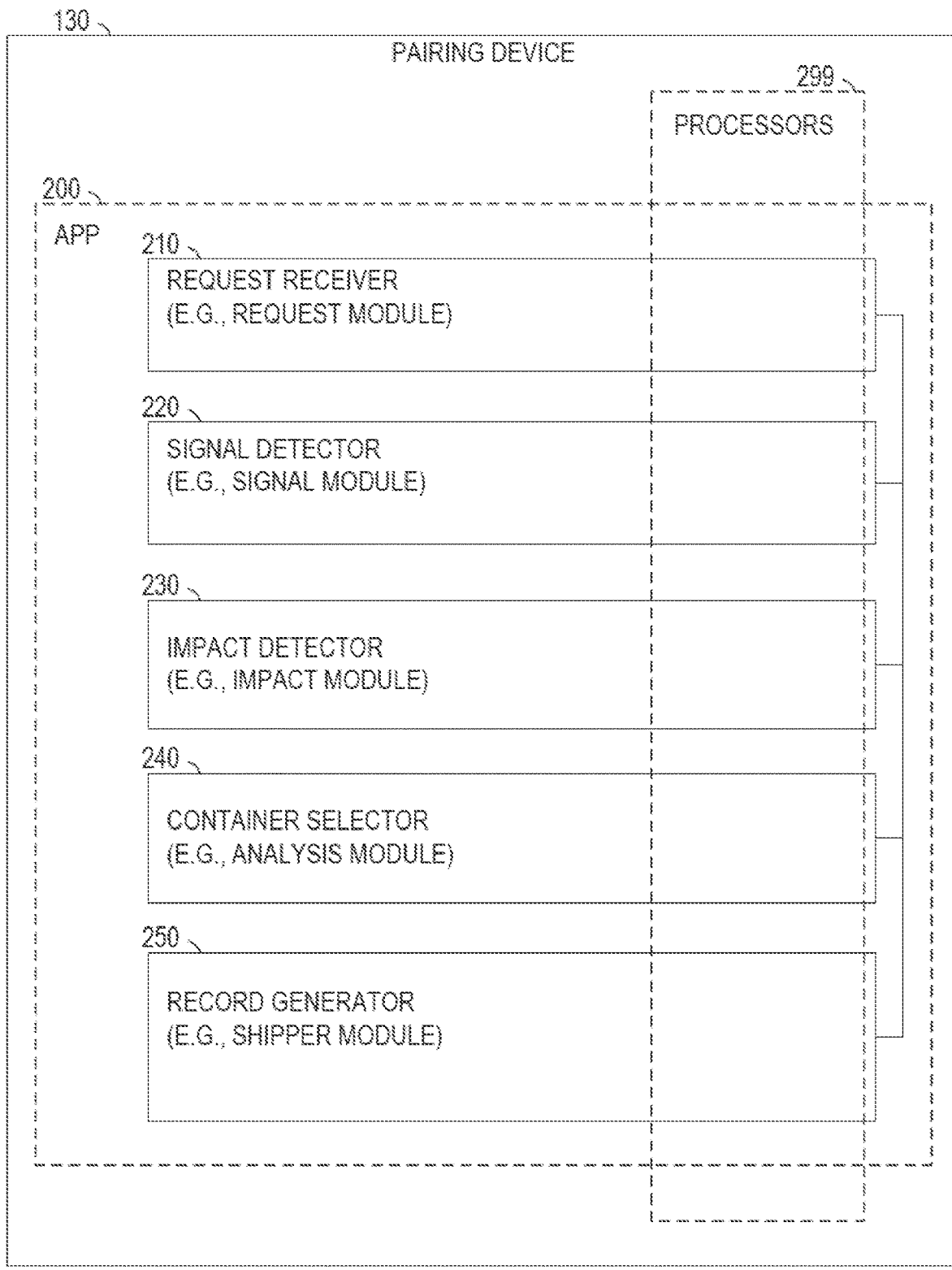
FIG. 2 is a block diagram illustrating components of a machine suitable for a container touch-pairing device, according to some example embodiments.

FIG. 2 is a block diagram illustrating selected components of the pairing device 130, according to some example embodiments. The pairing device 130 is shown as including a request receiver 210, a signal detector 220, an impact detector 230, a container selector 240, and a record generator 250, all configured to communicate with each other (e.g., via a bus, shared memory, or a switch).

As shown in FIG. 2, the request receiver 210, the signal detector 220, the impact detector 230, the container selector 240, and the record generator 250 may form all or part of an app 200 (e.g., a mobile app) that is stored (e.g., installed) on the pairing device 130 (e.g., responsive to or otherwise as a result of data being received from server machine device 110 via the network 190). Furthermore, one or more processors 299 (e.g., hardware processors, digital processors, or any suitable combination thereof) may be included (e.g., temporarily or permanently) in the app 200, the request receiver 210, the signal detector 220, the impact detector 230, the container selector 240, the record generator 250, or any suitable combination thereof.

Any one or more of the components (e.g., modules) described herein may be implemented using hardware alone (e.g., one or more of the processors 299) or a combination of hardware and software. For example, any component described herein may physically include an arrangement of one or more of the processors 299 (e.g., a subset of or among the processors 299) configured to perform the operations described herein for that component. As another example, any component described herein may include software, hardware, or both, that configure an arrangement of one or more of the processors 299 to perform the operations described herein for that component. Accordingly, different components described herein may include and configure different arrangements of the processors 299 at different points in time or a single arrangement of the processors 299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

In some example embodiments, one or more of the request receiver 210, the container selector 240, and the record generator 250 are located outside the pairing device 130, such as within the server machine 110, or within another machine within the network-based system 105. The request receiver 210, the container selector 240, and record generator 250 may further be physically located in different locations, such as some components being located within the pairing device 130 and some components being located within the server machine 110 or within other structures of the network-based system 105. Even where the components in the app 200, and the processors 299 are physically located apart, they are still capable of communicating and engaging in coordinated operations over the network 190.

Figure 3:
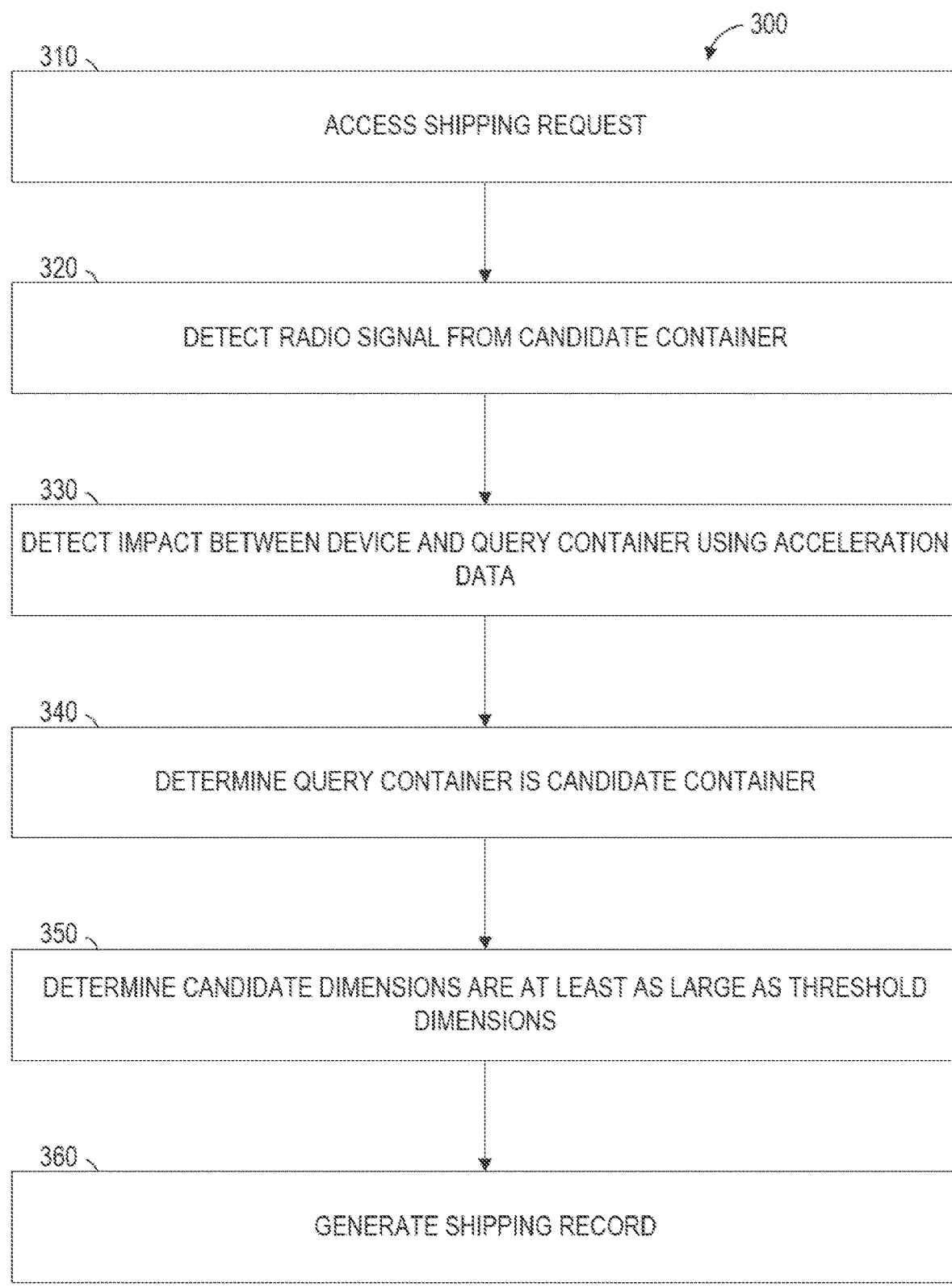
FIGS. 3-7 are flowcharts illustrating operations of a device in performing a method of a container touch-pairing device, according to some example embodiments.
Figure 4:
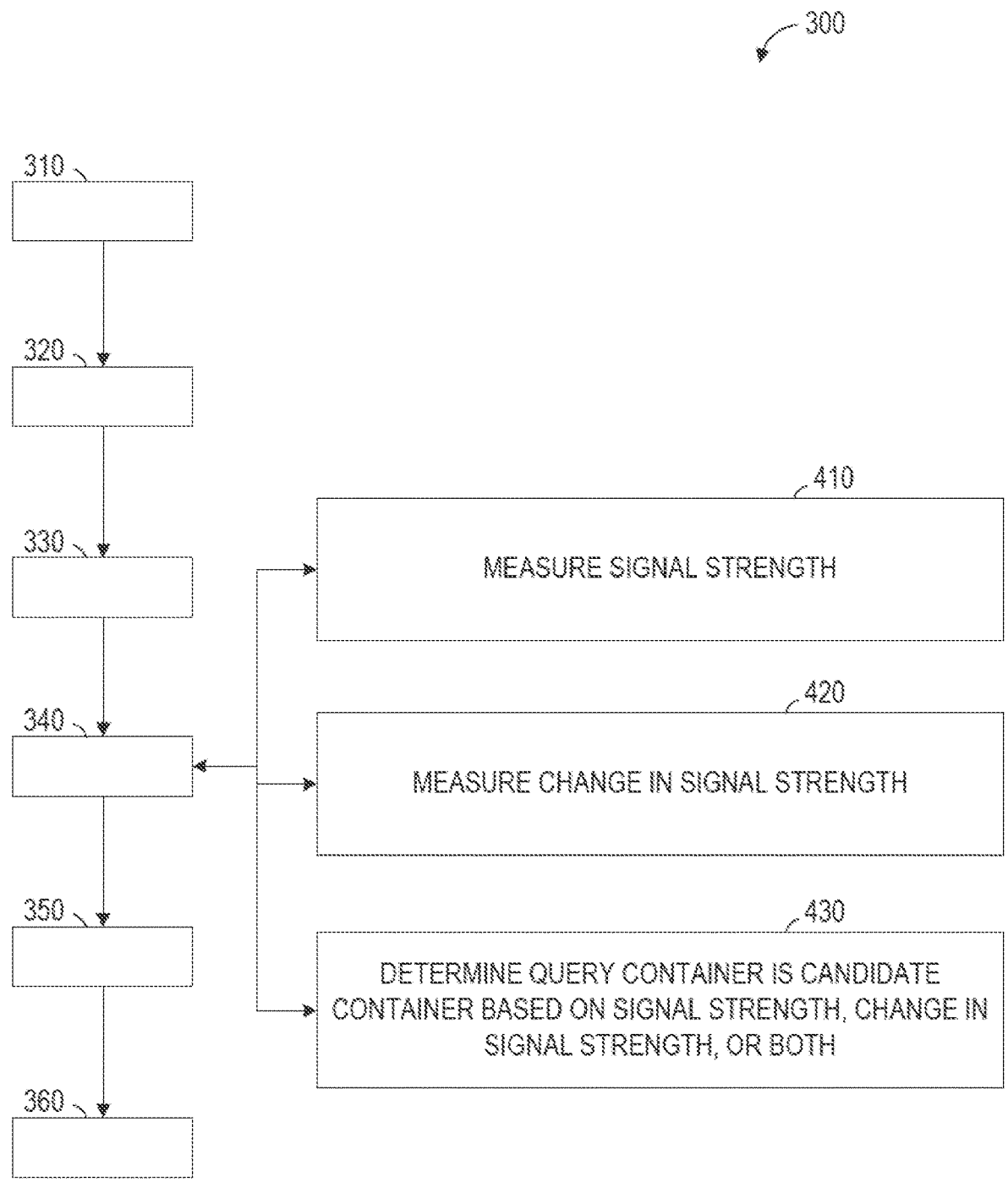

FIGS. 3-7 are flowcharts illustrating operations of the paring device 130 in performing a method 300 of pairing a shipping container with an item, according to some example embodiments. Operations in the method 300 may be performed by the pairing device 130, using components (e.g., modules) described above with respect to FIG. 2, using one or more processors (e.g., microprocessors or other hardware processors), or using any suitable combination thereof. As shown in FIG. 3, the method 300 includes operations 310, 320, 330, 340, 350, and 360.

In operation 310, the request receiver 210, responsive to the user 132 submitting a user request to ship an item, accesses information contained in the shipping request. The accessed information includes the shipping identifier for the item, as well as a set of threshold dimensions describing the smallest container in which the item can be shipped. The user 132 may have submitted the user request to ship by progressing to a confirmation point in a shipping transaction. In some example embodiments, the request receiver 210 accesses the user request to ship the item responsive to the user 132 interacting with a user interface to designate the method of delivery for the item, paying for the method of delivery, or both. The user 132 may have generated the user request 130 using an application on the pairing device 130 or another device.

In an example embodiment of operation 310, responsive to the user 132 generating the user request by interacting with the pairing device 130, the server machine 110 generates a shipping request. The shipping request includes the shipping identifier and the set of threshold dimensions describing the smallest container in which the item can be shipped.

In an example scenario, the user 132 desired to ship a porcelain desk clock to his sister as a gift. The user 132 interacted with the pairing device 130 to select a shipping method and pay for the shipping with a credit card. The pairing device 130 received the payment information and generated the user request for the porcelain clock and transmits it to the server machine 110. The server machine 110 generates a shipping request including a shipping identifier for the porcelain desk clock and including a threshold set of dimensions that describe the smallest container in which the porcelain desk clock can be shipped. The request receiver 210 included in the pairing device 130 then accesses the shipping request for the porcelain desk clock that is generated by the server machine 110.

In operation 320, the signal detector 220, responsive to the request receiver 210 accessing the shipping request, detects a radio signal generated by a signal chip (e.g., a radio frequency identification chip), the signal chip being located in a candidate container. The signal detector 220 may perform operation 320 by detecting signal data generated by the radio receiver 136. For example, the radio receiver 136 included in the pairing device 130 detects the radio signal, generates the signal data, and transmits the signal data that is detected by the signal detector 220. After detecting the signal data, the signal detector 220 continues to detect additional signal data from the signal chip or from other signal chips.

The radio signal that is generated by the signal chip includes (e.g., within the data of the radio signal) a container identifier for the candidate container and a set of candidate dimensions describing the size of the container. For example, the container identifier can include information that designates the brand and material of the container. Further, the set of candidate dimensions can be located within the data of the radio signal or as part of the container, the set of candidate dimensions specifying the measurements (e.g., height, width, and depth) of the candidate container.

In the desk clock example, the radio receiver 136 on the pairing device detects a radio signal emitted from a radio chip that is affixed to an "E-Z Ship" brand small box. The radio receiver 136 transmits signal data included in the radio signal that is detected by the signal detector 220. The signal detector 220 detects, within the signal data, a container identifier linking the radio signal to the E-Z Ship small box and container dimensions for the E-Z Ship small box.

In operation 330, the impact detector 230, responsive to the request receiver 210 accessing the shipping request, detects an impact between the pairing device 130 and a query container. The detecting of the impact may include receiving acceleration data from the accelerometer 134. For example, the accelerometer 134 detects a change in acceleration (e.g., an impact), generates the acceleration data, and transmits the acceleration data to the impact detector 230.

In some example embodiments of operation 330, the impact detector 230 detects an impact between the pairing device 130 and the query container responsive to receiving acceleration data from the accelerometer 134 and detecting that the acceleration data transgressed a threshold deceleration value. For example, the impact detector 230 may detect an acceleration value from the acceleration data and compare the acceleration value to the threshold deceleration value. The impact detector 230 then detects an impact responsive to the acceleration value transgressing the threshold deceleration value.

In the desk clock example, the user 132 bumps the E-Z Ship small box with the pairing device 130. The accelerometer 134 generates acceleration data that is caused by the stop in motion caused by the bump with the E-Z Ship small box. The impact detector 230 receives the acceleration data from the accelerometer 134 and determines an acceleration value from the acceleration data. The impact detector 230 then detects that an impact has occurred because the acceleration value is higher than the threshold deceleration value.

In operation 340, the container selector 240, responsive to the impact detector 230 detecting the impact between the pairing device 130 and the query container, determines that the query container from the impact is the same as the candidate container that contains the signal chip. Specifically, the container selector 240 determines that the query container is the candidate container, and this determination may be based on the acceleration value and the signal data. In some cases, the container detector 240 determines that the query container is the candidate container if the signal detector 220 detects signal data due to the radio receiver 136 receiving the radio signal from the candidate container at the same time or close to the same time (e.g., within one second) that the impact detector 230 detects an impact between the pairing device 130 and the query container. Example embodiments of operation 340 may differ as to what constitutes the "same time." For example, the container selector 240 may be configured to only recognize detecting the impact and detecting the radio signal within one-tenth of a second as the "same time" and thus will only determine that the query container is the candidate container if the impact and the radio signal are detected within one In an example of operation 340, the container selector 240 may determine that the query container is the candidate container because, at the time the impact detector 230 detects an impact between the pairing device 130 and the query container using the acceleration data, the signal detector 220 retrieves signal data (e.g., from the radio receiver 136) that is included in the radio signal emitted from the signal chip on the candidate container. The container selector 240 may make this determination because, at the time of impact, the pairing device 130 is close enough to the candidate container that the radio receiver 136 is able to receive the radio signal emitted by the signal chip on the candidate container. The query container is also close at the time of impact because the query container is impacted by the pairing device. Thus, since the signal detector 220 detects the radio signal from the candidate container at the same time that the impact detects the impact between the pairing device 130 and the query container, the container selector 240 determines that the query container and the candidate container are the same.

In the desk clock example, the container selector 240 determines that the E-Z Ship small box emitting the radio signal is the same as the E-Z Ship box that the user has bumped with the pairing device 130. The signal detector 220 may receive the signal data originating from the signal chip on the E-Z Ship small box within one second of the impact detector 230 detects the bump.

In operation 350, after the container selector 240 determines that the query container is the candidate container, the container selector 240 determines that the candidate dimensions are at least as large as the threshold dimensions included in the shipping request. Specifically, the container selector 240 retrieves values for candidate container dimensions (e.g., height, width, and depth) from the signal data and compares the candidate container dimensions to values for the threshold container dimensions from the shipping request. In some example embodiments, if one of the candidate container dimensions is substantially smaller than (e.g., by any amount, by more than one centimeter, or 2% smaller than any of the measured dimensions) the corresponding threshold container dimensions, the container selector 240 determines that the item will not fit in the candidate container, and the container selector may abort the shipping process.

In operation 360, the record generator 250, responsive to the container selector 240 determining that the candidate dimensions are at least as large as the threshold dimensions, generates a shipping record. In some example embodiments of operation 360, the record generator 250 correlates data contained in the shipping identifier with data contained in the container identifier into one unified shipping record. Thus, the pairing device 130 pairs the item with the candidate container by generating a shipping record correlating the shipping identifier with the container identifier. In the desk clock example, after the container selector 240 determines that the porcelain desk clock can fit in the E-Z Ship small box based on a comparison of the candidate dimensions and the threshold dimensions, the record generator 250 creates a shipping record correlating the E-Z Ship small box with the porcelain desk clock.

In some example embodiments, method 300 includes further operations, such as operations 410, 420, and 430. Operations 410, 420, and 430 each provide additional basis for the container selector 240 to determine that the candidate container is the same as the query container. In operation 410, the container selector 240 measures the strength of the signal that is emitted from the signal chip. Measuring the signal strength can include the radio receiver 136 recording the strength of the signal onto signal data that is transferred to the signal detector 220 and then to the container selector 240. The signal detector 220 additionally measures a change in signal strength using the data received by the signal detector in operation 420. The signal detector additionally determines, based on the signal strength and the change in signal strengths, that the query container is the same as the candidate container in operation 430.

In some example embodiments, the container selector 240 further measures a signal strength value from the signal data, the signal strength value corresponding to the radio signal detected by the radio receiver 136. The container selector 240 can further determine a change in signal strength by comparing the signal strength gathered at two or more instances between the point in time that the request receiver 210 accesses the shipping request and the point in time when the impact detector 230 detects the impact between the pairing device 130 and the query container.

In some example embodiments, the container selector 240 determines that the query container is the candidate container using at least one of the acceleration value, the signal strength value, and the change in signal strength. For example, the container selector 240 may determine that the query container is the candidate container because the signal strength increases between the point in time that the request receiver 210 accesses the shipping request and the point in time that the impact detector 230 detects the impact between the pairing device 130 and the query container. The container selector 240 makes this determination because the increase in signal strength correlates to the pairing device 130 getting closer to the candidate container and the impact between the pairing device 130 and the query container is likely the closest point between the pairing device 130 and the candidate container. Thus, the container selector can determine that the pairing device 130 has impacted the candidate container.

Figure 5:
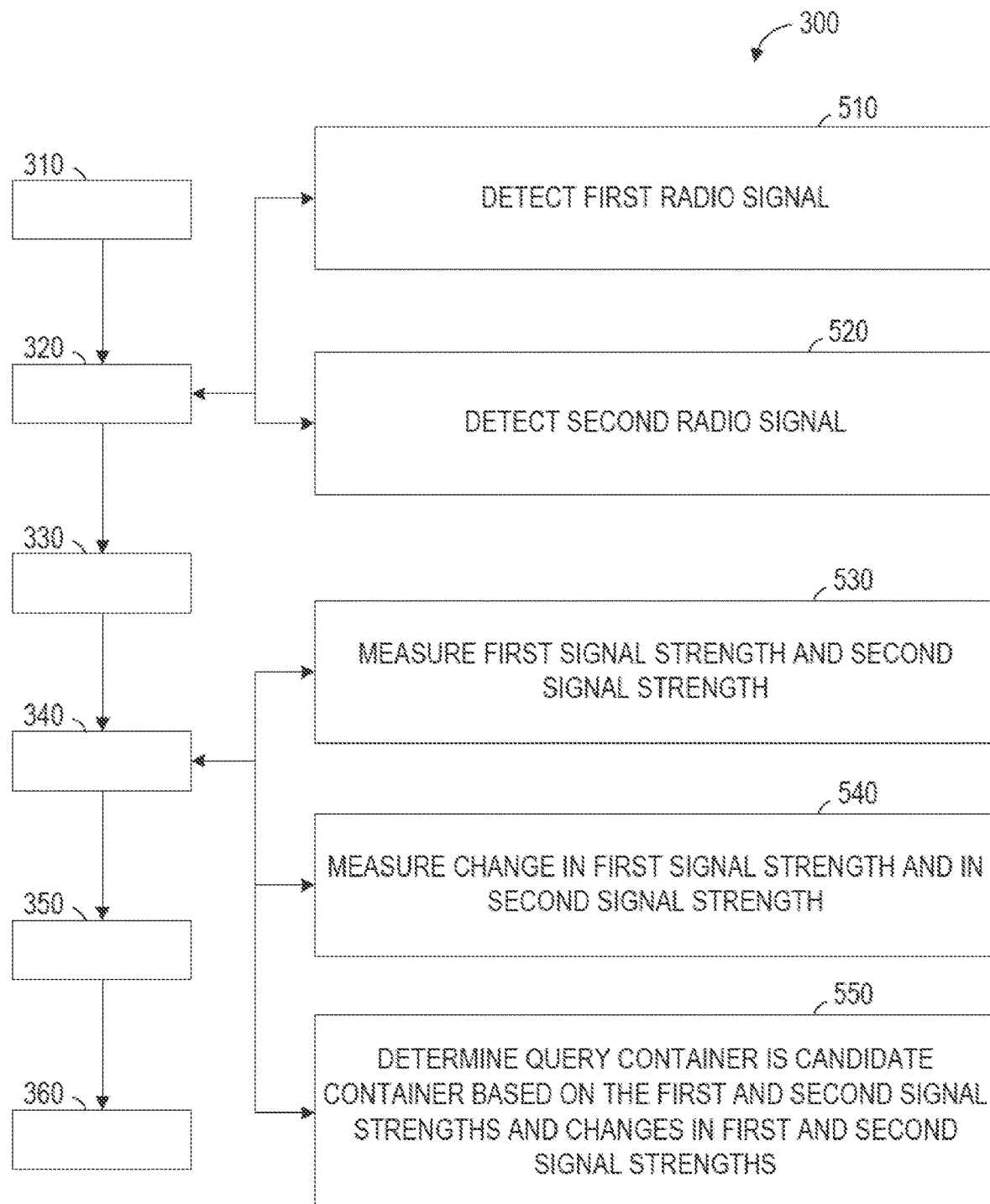
Figure 6:
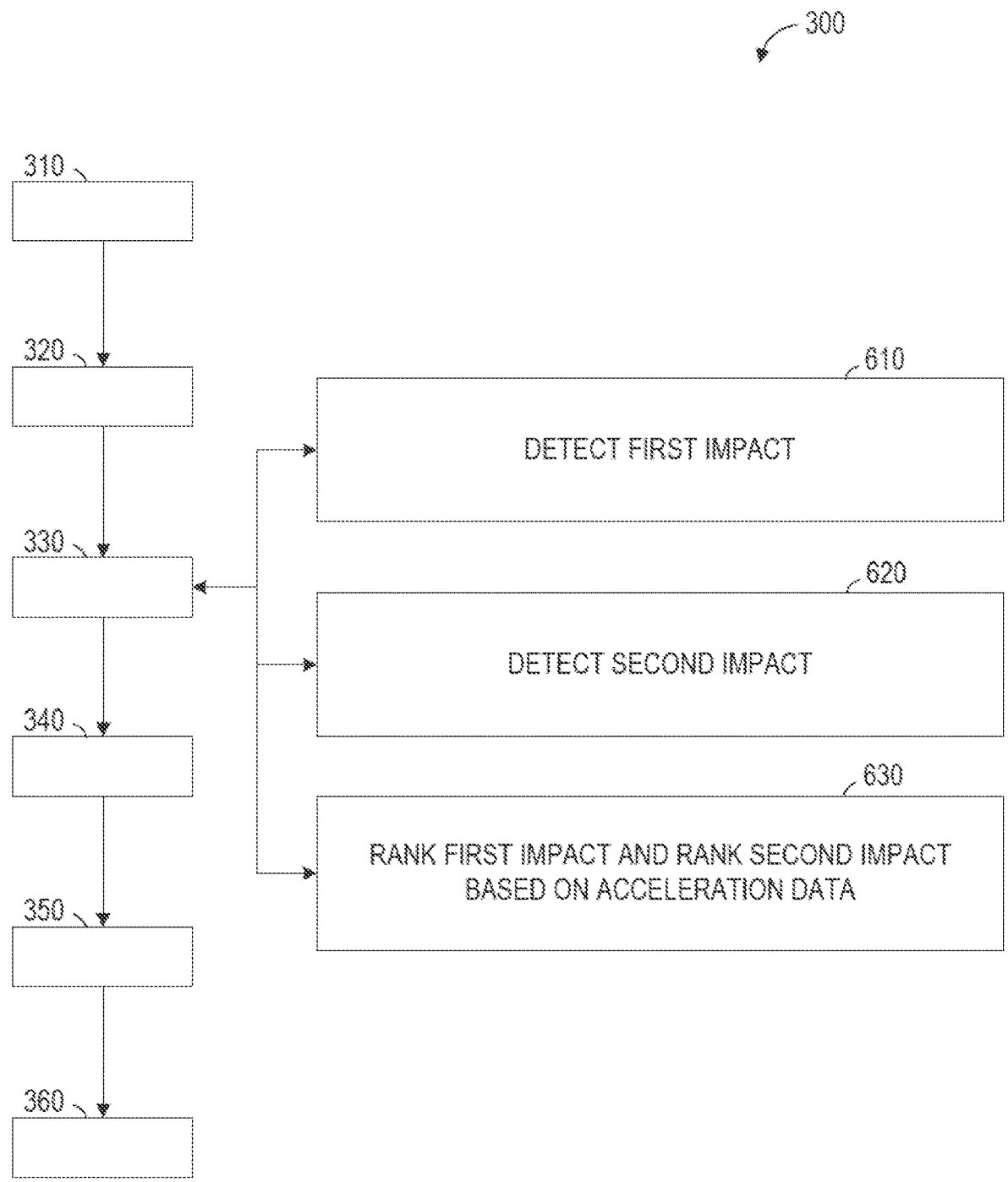
Figure 7:
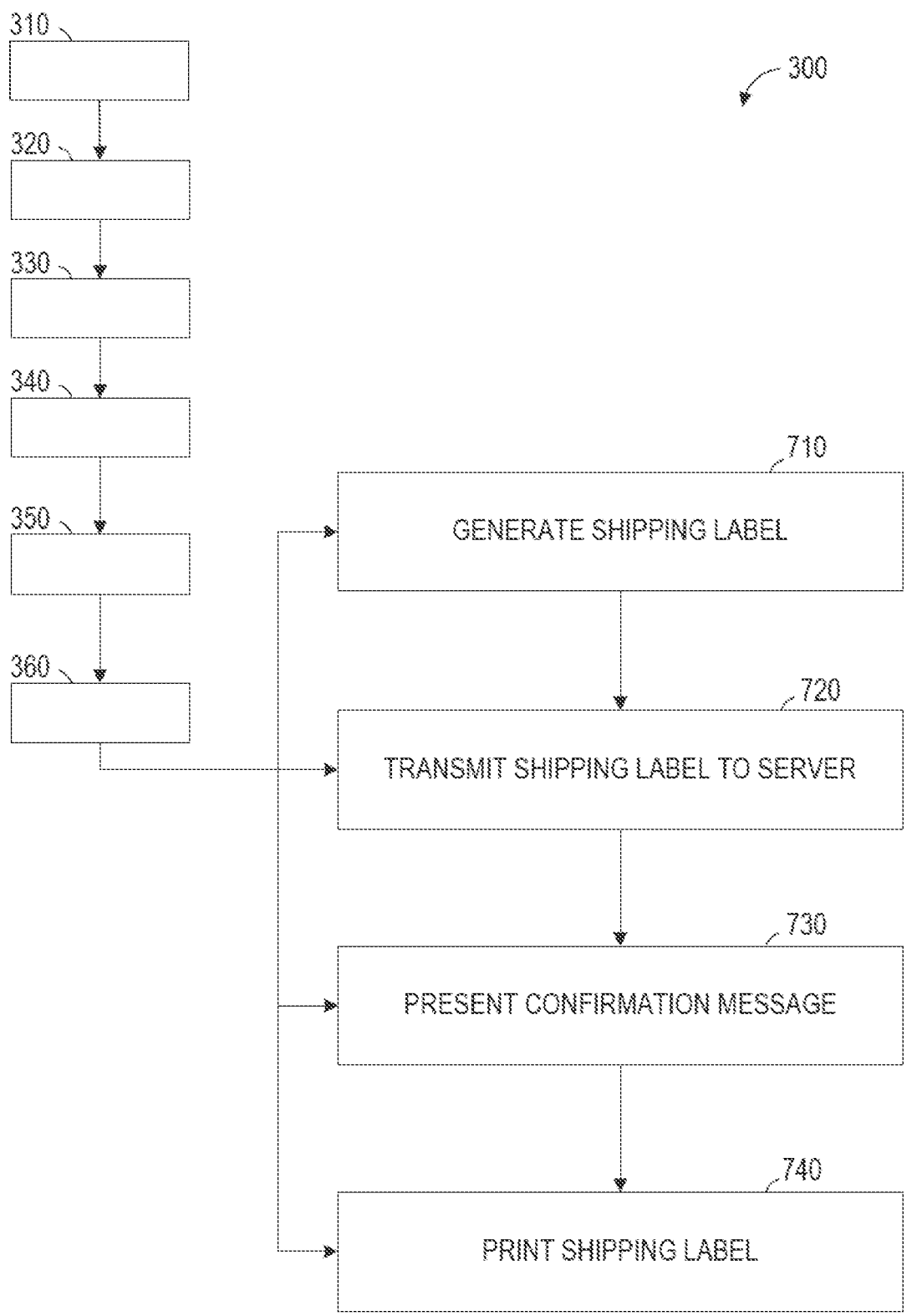

In some example embodiments, method 300 includes further sub operations of operation 320, such as operations 510 and 520 as shown in FIG. 5. In operation 510, the signal detector detects signal data received from the radio receiver 136 corresponding to a first radio signal and in operation 520, the signal detector detects signal data from the radio receiver 136 corresponding to a second radio signal.

In some example embodiments, method 300 includes further sub operations of operation 340, such as operations 530, 540, and 550, as shown in FIG. 5. In operation 530 and 540, similar to operations 410 and 420 above, the signal detector 220 measures the strength of each of the first and second radio signals as well as a change in strength of each of the first and second radio signals. In operation 550, the container selector 240 receives the measurements of signal strength and change in signal strength from the signal detector 220 and determines whether the first or the second radio signal is emitted from the signal chip located in the query container by comparing the strengths and changes in strengths of the first and the second radio signals.

In the desk clock example, the E-Z Ship small box includes a signal chip that generates a first radio signal and an E-Z Ship long box includes a signal chip that generates a second radio signal. Responsive to the request receiver 210 accessing a shipping request the radio receiver 136 detects both signals and transmits signal data to the signal detector 220 and the signal detector 220. The signal detector 220 further detects data from the impact detector 230 representing an impact between the pairing device 130 and the E-Z Ship small box. The signal detector 220 then measures the signal strength of the first signal and the signal strength of the second signal at one or more points in time between the point in time that the request receiver 210 accesses the shipping request and the point in time when the impact detector 230 detects an impact between the pairing device 130 and the E-Z Ship small box. The container selector 240 then compares the change in signal strength of the first signal and the change in signal strength from the second signal. The container selector 240 determines that the E-Z Ship small container is the container that the user has bumped the pairing device 130 against because the first signal strength increases between the point in time that the request receiver 210 accesses the shipping request and the point in time that impact detector 230 detects the impact compared to the second signal remaining more constant between the points in time. Thus, the change in signal strength data suggests that the pairing device 130 moved toward the first signal prior to impact and that the E-Z Ship small box that generated the first signal is the candidate container.

In some example embodiments, method 300 includes further sub operations of operation 330, such as operations 610, 620, and 630. In operation 610 and 620 the impact detector 230 detects both a first impact and a second impact after the request receiver 210 accesses the shipping request. In operation 630, the impact detector 230 determines a rank for the first impact and a rank for the second impact by comparing the acceleration data generated by the first impact and the second impact. In certain example embodiments of operation 630, the impact detector 230 may assign a higher rank to an impact that shows a higher deceleration value based on the acceleration data because the deceleration value is likely to be higher during the impact between the query container and the candidate container rather than an incidental deceleration.

In the desk clock example, after the request receiver 210 accesses the shipping request for the porcelain desk clock, the accelerometer 134 generates a first set of acceleration data. The impact detector 230 detects the first set of acceleration data as a first impact, however the accelerometer 134 generated the data from the pairing device 130 slowing down rather than actually impacting a query container. The accelerometer 134 then generates a second set of acceleration data responsive to the pairing device 130 impacting the E-Z Ship small box. The impact detector 230 then detects the second set of acceleration data as a second impact and assigns a higher rank to the second impact because the deceleration value for the second impact is greater than the one for the first impact. Thus, the impact detector 230 determines that the second impact is the impact between the pairing device 130 and the query container, in this case, the E-Z Ship small box.

In some example embodiments, method 300 includes further operations, such as one or a combination of operations 710, 720, 730, and 740. In operation 710, after generating the shipping record, the record generator 250 transmits the shipping record to the server machine 110 over the network 190. In operation 720, the server machine 110 generates a shipping label, the label including information about the item and the candidate container that the item will be shipped in. In operation 730, after generating the shipping label, the server machine 110 may present a confirmation message on a graphic user interface, such as on the pairing device 130, to verify the pairing of the item and the candidate container. In operation 740, the server machine 110 can transmit the shipping label to a printer to print the shipping label.

In some example embodiments of operation 730, the server machine 110 presenting a confirmation message can include an augmented reality confirmation viewable to the user 132 on the pairing device 130. For example, the pairing device 130 may display an augmented reality to the user 132 by altering an image received from a camera included in the pairing device. The alteration could cause the query container to appear in a different color or shape on the graphic user interface of the pairing device 130 to confirm to the user that the item has been paired to the query container.

Figure 8:
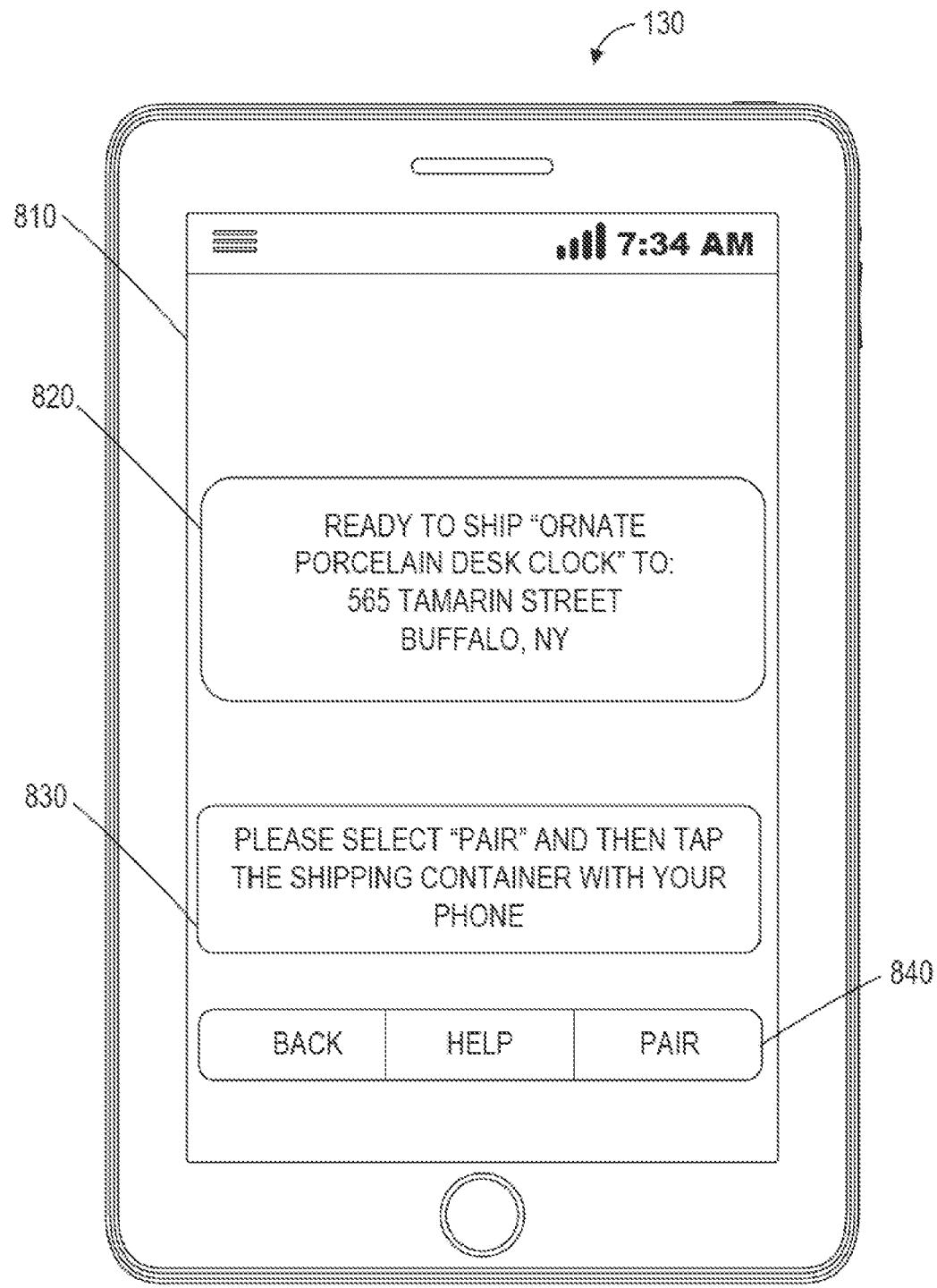
FIGS. 8-12 are example illustrations of the container touch-pairing device interacting with a user to facilitate pairing a shipping container with an item based on a received radio signal and a physical impact.

FIG. 8 is an illustration showing performance of an example embodiment of operation 310, in which the request receiver accesses the shipping request. FIG. 8 additionally continues the desk clock example, in which the user 132 desires to ship the porcelain desk clock in the E-Z Ship small box.

In this example, the pairing device 130 is shown displaying a user interface 810, which may be a graphical user interface. Displayed on the user interface 810 in a shipping window 820 is a title for the porcelain desk clock and the destination to which the user desires to send the desk clock. The pairing device 130 may further show a query window 830 that prompts the user 132 with a question and an interactive bar 840 that allows the user 132 to select an action from among multiple actions. In this example, the interactive bar 840 allows the user 132 to select "Pair" to cause the request receiver 210 to access the shipping request for the desk clock.

Figure 9:
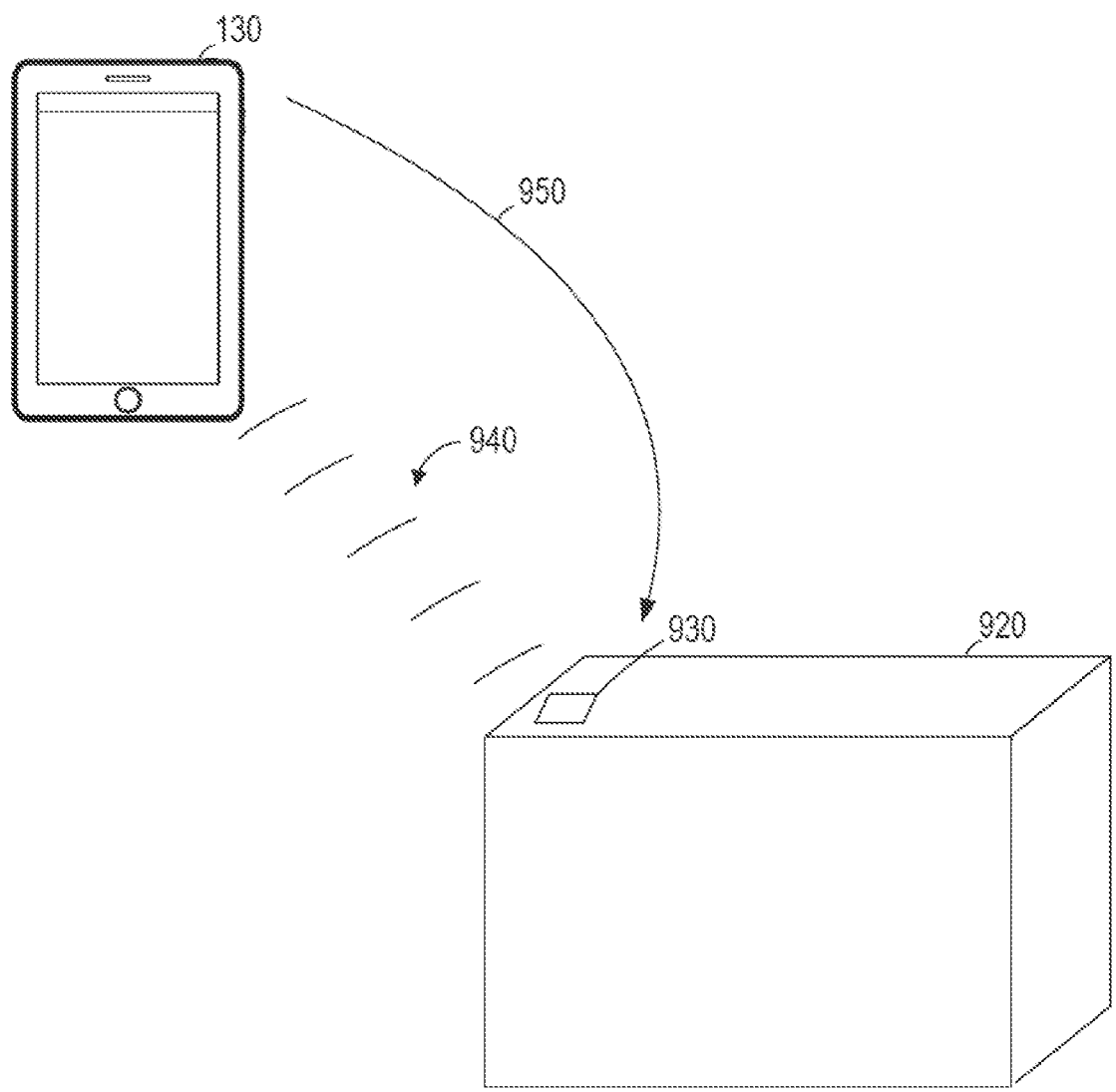

FIG. 9 is an illustration showing performance of an example embodiment of operation 320, in which the radio receiver 136 detects a radio signal 940 emitted from the signal chip 930 that is included in the candidate container 920. FIG. 9 additionally illustrates an example embodiment of operations 410 and 420, where the signal detector 220 measures the signal strength of the radio signal 940. Additionally, the signal detector 220 can measure the change in the signal strength of the radio signal 940 as the pairing device 130 follows an impact trajectory 950 that nears the candidate container 920.

Figure 10:
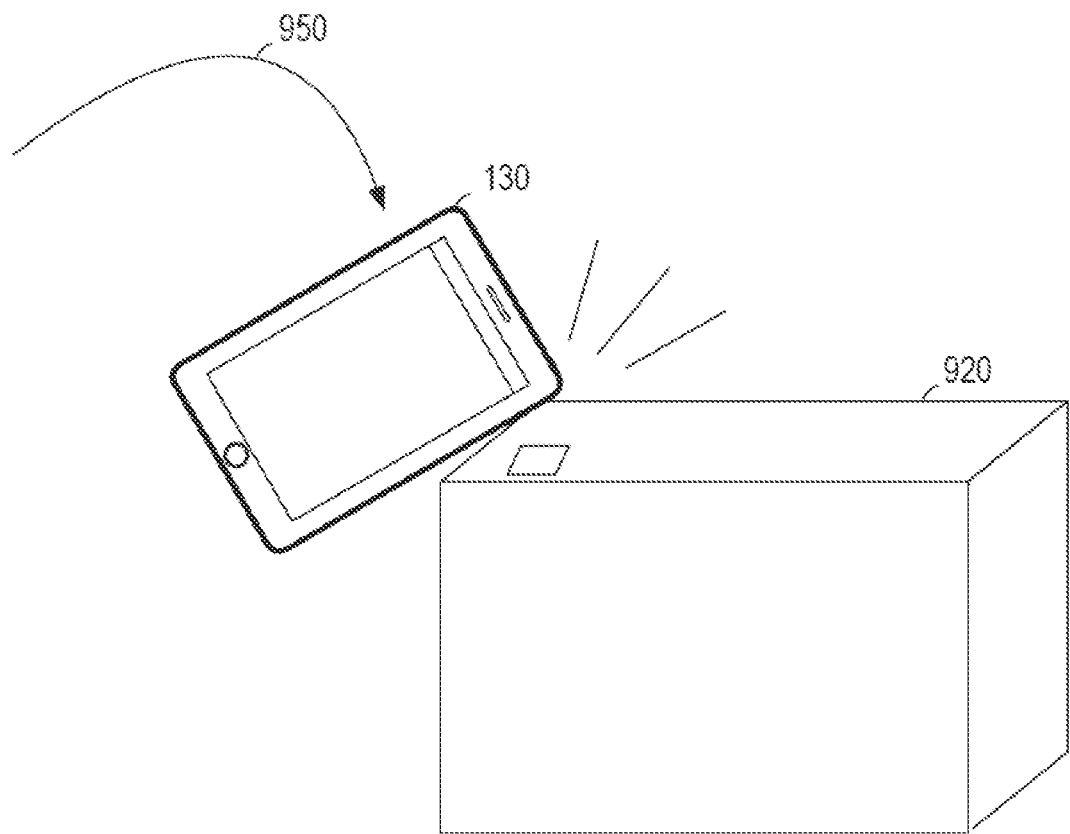

FIG. 10 is an illustration showing performance of an example embodiment of operation 330, in which the impact detector 230 determines an acceleration value from acceleration data received from the accelerometer 134, the acceleration value transgressing the threshold deceleration value for an impact. In the example, the deceleration caused by the pairing device 130 ending the impact trajectory 950 by colliding with the candidate container 920 causes the accelerometer 134 to generate the acceleration data.

Figure 11:
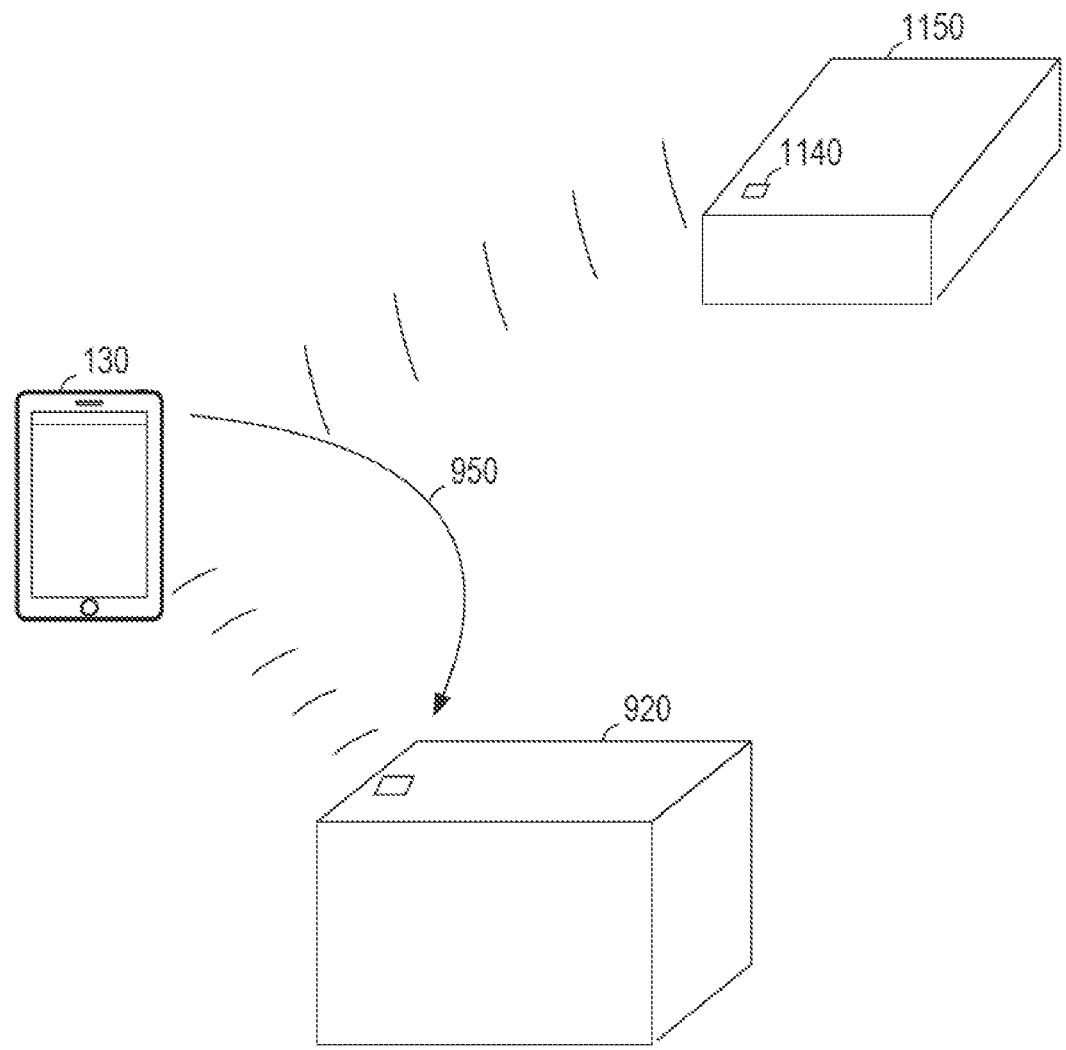

FIG. 11 is an illustration showing performance of an example embodiment of operations 510 and 520, in which the radio receiver 136 detects a first radio signal 1160 emitted from the candidate container 920 as well as a second radio signal 1170 emitted from a second candidate chip 1140 on an alternate container 1150. FIG. 11 additionally illustrates performance of an example embodiment of operations 530-550, in which the signal detector 220 measures the signal strengths and changes in signal strengths from the first radio signal 1160 and the second radio signal 1170 as the pairing device 130 continues along the impact trajectory 950. In this example, the signal strength of the first radio signal 1160 will increase as the pairing device 130 nears the candidate container 920, whereas the strength of the second radio signal 1170 remains constant. Based on the signal data collected by the signal detector 220, the container selector 240 can determine that the query container that the pairing device 130 impacts at the end of the impact trajectory 950 is the candidate container 920.

Figure 12:
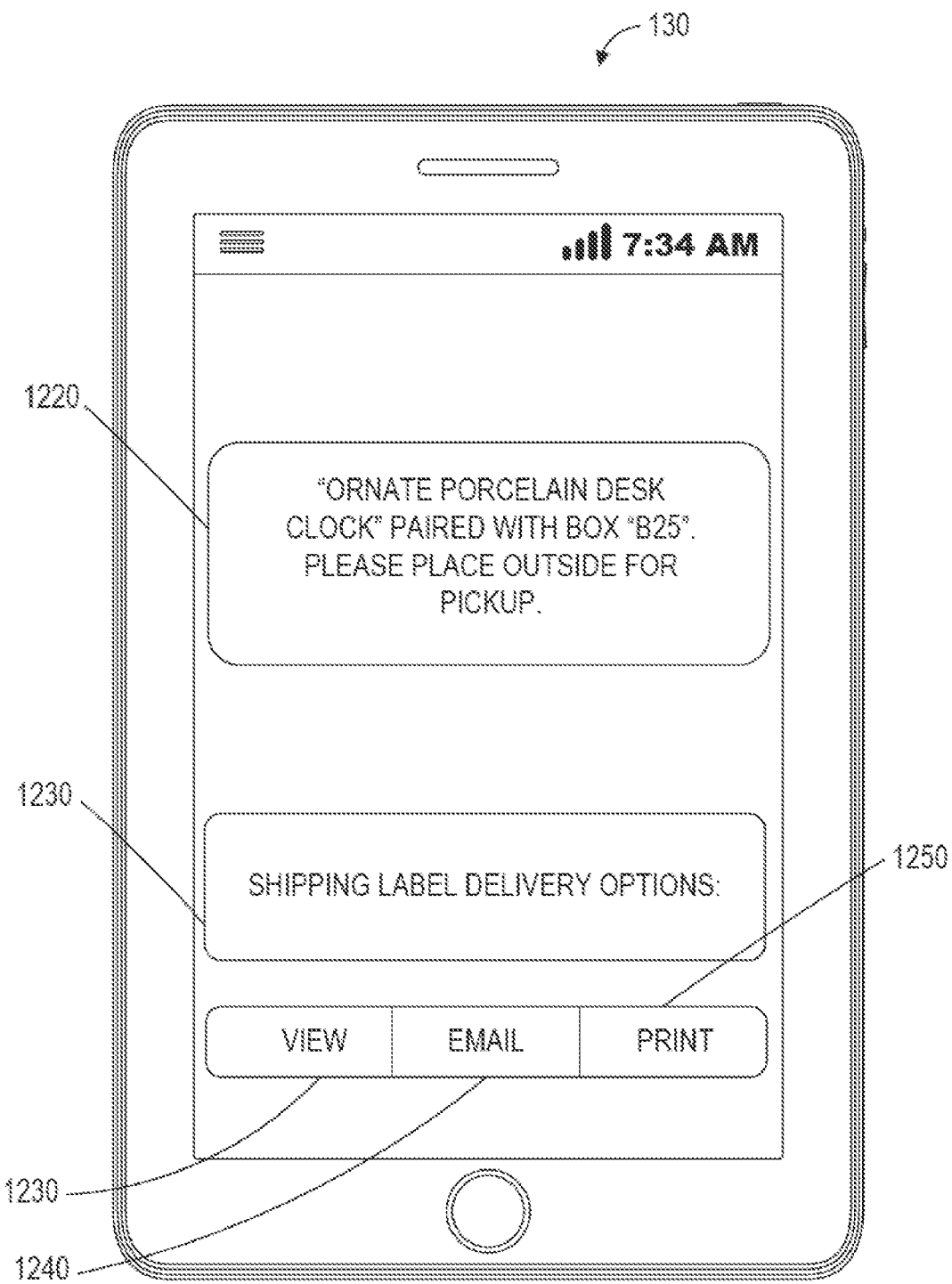

FIG. 12 is an illustration showing performance of an example embodiment of operation 730, in which the server machine 110 causes a confirmation message to be displayed on the pairing device 130. In the illustration, a confirmation window 1220 verifies to a user that the container has successfully paired with the item. In this example, the user has successfully paired the E-Z Ship small box with the porcelain desk clock. Further, the query window 830 has changed to ask if the user 132 would like to see the shipping label and the interactive bar 840 has changed to give options for how to access the shipping label, including viewing the shipping label on the pairing device 130, emailing the shipping label to the user 132, or printing the shipping label.

According to various example embodiments, one or more of the methodologies described herein may facilitate pairing a shipping container with an item that is to be transported in the shipping container. Moreover, one or more of the methodologies described herein may facilitate pairing a shipping container with an item that is to be transported in the shipping container.

When these effects are considered in aggregate, one or more of the methodologies described herein may obviate a need for certain efforts or resources that otherwise would be involved in pairing a shipping container with an item that is to be transported in the shipping container. Efforts expended by a user in pairing a shipping container with an item that is to be transported in the shipping container may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 13:
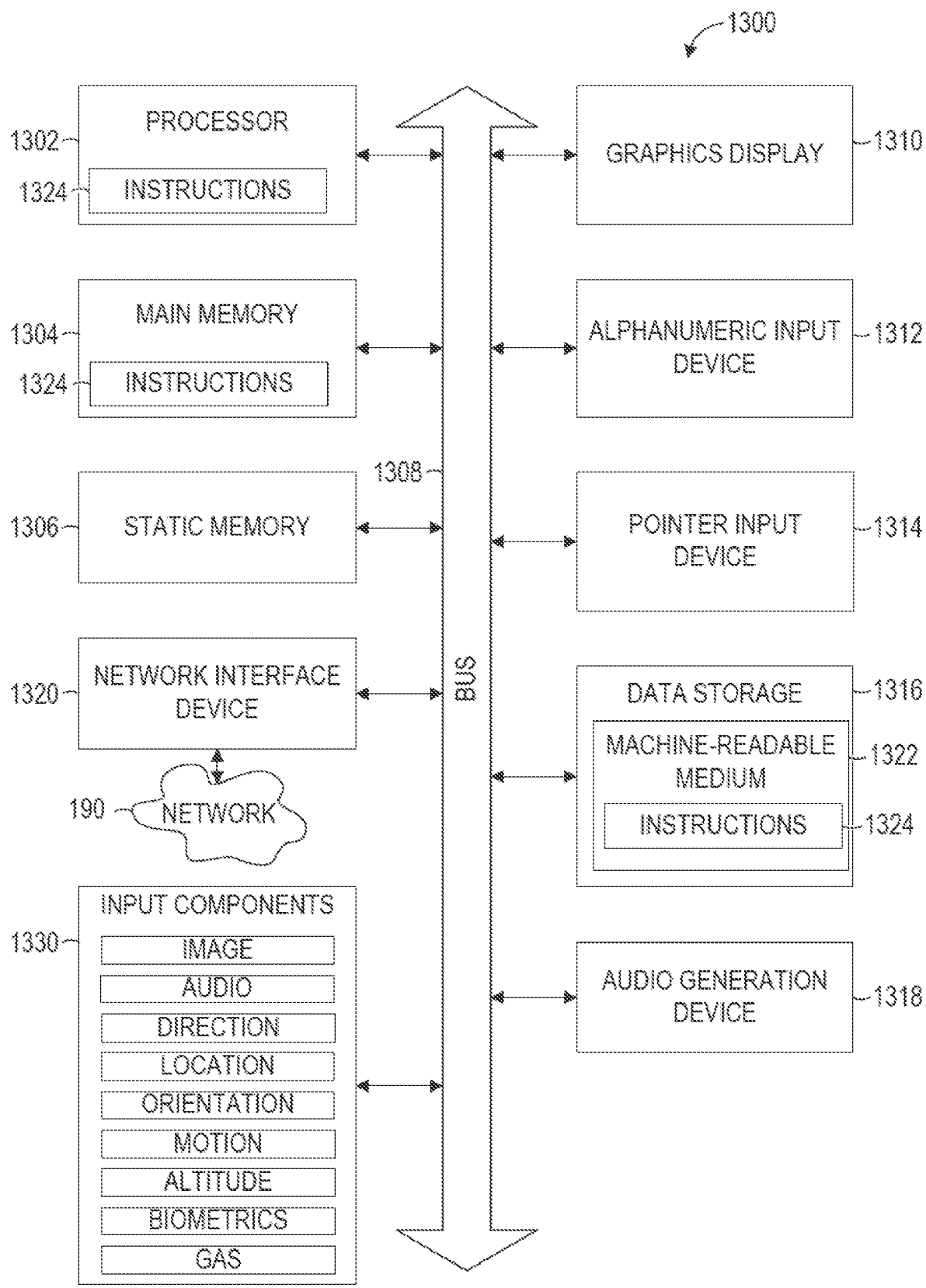
FIG. 13 is a block diagram illustrating components of a machine, according to some example embodiments, able to read instructions from a machine-readable medium and perform any one or more of the methodologies discussed herein.

FIG. 13 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part.

In alternative embodiments, the machine 1300 operates as a standalone device or may be communicatively coupled (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1304, and a static memory 1306, which are configured to communicate with each other via a bus 1308. The processor 1302 contains solid-state digital microcircuits (e.g., electronic, optical, or both) that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein. In some example embodiments, the processor 1302 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1300 with at least the processor 1302, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a pointer input device 1314 (e.g., a mouse, a touchpad, a touchscreen, a trackball, a joystick, a stylus, a motion sensor, an eye tracking device, a data glove, or other pointing instrument), a data storage 1316, an audio generation device 1318 (e.g., a sound card, an amplifier, a speaker, a headphone jack, or any suitable combination thereof), and a network interface device 1320.

The data storage 1316 (e.g., a data storage device) includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the static memory 1306, within the processor 1302 (e.g., within the processor's cache memory), or any suitable combination thereof, before or during execution thereof by the machine 1300. Accordingly, the main memory 1304, the static memory 1306, and the processor 1302 may be considered machine-readable media (e.g., tangible and non-transitory machine-readable media). The instructions 1324 may be transmitted or received over the network 190 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device (e.g., a smart phone, a tablet computer, or a wearable device), and may have one or more additional input components 1330 (e.g., sensors or gauges). Examples of such input components 1330 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 1324 for execution by the machine 1300 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 1324).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method for selecting a candidate container comprising:
    accessing, by one or more processors of a device, a shipping request to ship an item having a set of dimensions, the shipping request including a shipping identifier of the item, the shipping request being accessed from a server;
    detecting a first radio signal generated by a signal chip in a query container;
    determining a first signal strength of the first radio signal;
    detecting, by an accelerometer of the device, an impact between the device and the query container;
    detecting a second radio signal generated by the signal chip in the query container;
    determining a second signal strength of the second radio signal;
    determining a difference between the first signal strength and the second signal strength;
    determining that the query container is the candidate container based on the difference between the first signal strength and the second signal strength; and
    in response to determining that the query container is the candidate container, generating a shipping record that correlates the shipping identifier of the item with the candidate container.

2. The method of claim 1, wherein the second signal strength is greater than the first signal strength and the query container is determined to be the candidate container based on the second signal strength being greater than the first signal strength.

3. The method of claim 2, wherein the device is closer to the query container when the second signal strength is greater than the first signal strength.

4. The method of claim 1, wherein the first radio signal is detected after accessing the shipping request and the second radio signal is detected after detecting the impact between the device and the query container.

5. The method of claim 1, wherein the first radio signal includes a set of candidate dimensions associated with the query container.

6. The method of claim 5, wherein determining that the query container is the candidate container further includes comparing the set of candidate dimensions associated with the query container with the set of dimensions.

7. The method of claim 1, further comprising presenting a confirmation message that correlates the shipping identifier to a container identifier of the candidate container.

8. A system for selecting a candidate container comprising:
    one or more processors of a machine;
    a memory storing instructions that, when executed by the one or more processors, cause the machine to perform operations comprising:
        accessing a shipping request to ship an item having a set of dimensions, the shipping request including a shipping identifier of the item, the shipping request being accessed from a server;
        detecting a first radio signal generated by a signal chip in a query container;
        determining a first signal strength of the first radio signal;
        detecting, by an accelerometer of the machine, an impact between the machine and the query container;

detecting a second radio signal generated by the signal chip in the query container;
determining a second signal strength of the second radio signal;
determining a difference between the first signal strength and the second signal strength;
determining that the query container is the candidate container based on the difference between the first signal strength and the second signal strength; and
in response to determining that the query container is the candidate container, generating a shipping record that correlates the shipping identifier of the item with the candidate container.

9. The system of claim 8, wherein the second signal strength is greater than the first signal strength and the query container is determined to be the candidate container based on the second signal strength being greater than the first signal strength.

10. The system of claim 9, wherein the machine device is closer to the query container when the second signal strength is greater than the first signal strength.

11. The system of claim 8, wherein the first radio signal is detected after accessing the shipping request and the second radio signal is detected after detecting the impact between the machine and the query container.

12. The system of claim 8, wherein the first radio signal includes a set of candidate dimensions associated with the query container.

13. The system of claim 12, wherein determining that the query container is the candidate container further includes comparing the set of candidate dimensions associated with the query container with the set of dimensions.

14. The system of claim 8, wherein the operations further comprise presenting a confirmation message that correlates the shipping identifier to a container identifier of the candidate container.

15. A non-transitory machine-readable storage medium comprising instructions that, when executed by one or more processors of a machine, cause the machine to perform operations comprising:
accessing a shipping request to ship an item having a set of dimensions, the shipping request including a shipping identifier of the item, the shipping request being accessed from a server;
detecting a first radio signal generated by a signal chip in a query container;
determining a first signal strength of the first radio signal;
detecting, by an accelerometer of the machine, an impact between the machine device and the query container;
detecting a second radio signal generated by the signal chip in the query container;
determining a second signal strength of the second radio signal;
determining a difference between the first signal strength and the second signal strength;
determining that the query container is a candidate container based on the difference between the first signal strength and the second signal strength; and
in response to determining that the query container is the candidate container, generating a shipping record that correlates the shipping identifier of the item with the candidate container.

16. The non-transitory machine-readable storage medium of claim 15, wherein the second signal strength is greater than the first signal strength and the query container is determined to be the candidate container based on the second signal strength being greater than the first signal strength.

17. The non-transitory machine-readable storage medium of claim 16, wherein the machine is closer to the query container when the second signal strength is greater than the first signal strength.

18. The non-transitory machine-readable storage medium of claim 15, wherein the first radio signal is detected after accessing the shipping request and the second radio signal is detected after detecting the impact between the machine and the query container.

19. The non-transitory machine-readable storage medium of claim 15, wherein the first radio signal includes a set of candidate dimensions associated with the query container and determining that the query container is the candidate container further includes comparing the set of candidate dimensions associated with the query container with the set of dimensions.

20. The non-transitory machine-readable storage medium of claim 15, wherein the operations further comprise presenting a confirmation message that correlates the shipping identifier to a container identifier of the candidate container.

\* \* \* \* \*